(12) United States Patent
Sugiyama

(10) Patent No.: US 7,474,952 B2
(45) Date of Patent: Jan. 6, 2009

(54) FUEL INJECTION CONTROLLER

(75) Inventor: Kouichi Sugiyama, Chiryu (JP)

(73) Assignee: Denso Corporation (JP)

( * ) Notice: Subject to any disclaimer, the term of this patent is extended or adjusted under 35 U.S.C. 154(b) by 72 days.

(21) Appl. No.: 11/808,126

(22) Filed: Jun. 6, 2007

(65) Prior Publication Data

US 2008/0009999 A1 Jan. 10, 2008

(30) Foreign Application Priority Data

Jun. 6, 2006 (JP) ............................. 2006-156891

(51) Int. Cl.
*G06F 17/00* (2006.01)
(52) U.S. Cl. .................. 701/104; 701/110; 123/299
(58) Field of Classification Search .............. 701/103, 701/104, 105, 109, 110, 111; 123/299, 339.12, 123/674, 675, 350, 352, 357
See application file for complete search history.

(56) References Cited

U.S. PATENT DOCUMENTS

| | | | |
|---|---|---|---|
| 6,085,142 A * | 7/2000 | Di Leo et al. ............... | 701/104 |
| 6,412,469 B1 * | 7/2002 | Itoyama et al. .............. | 123/299 |
| 6,755,176 B2 | 6/2004 | Takeuchi et al. | |
| 6,763,799 B2 * | 7/2004 | Ito et al. ...................... | 123/299 |
| 6,907,861 B2 * | 6/2005 | Asano et al. ................. | 123/395 |
| 6,959,241 B2 * | 10/2005 | Itow et al. .................... | 701/102 |
| 6,990,950 B2 * | 1/2006 | Asano et al. ................. | 123/299 |
| 7,013,852 B2 * | 3/2006 | Harada et al. ............. | 123/90.15 |
| 7,032,582 B2 * | 4/2006 | Asano et al. ................. | 123/674 |
| 7,317,983 B2 * | 1/2008 | Ishizuka et al. ............. | 701/103 |
| 7,392,797 B2 * | 7/2008 | Ogawa et al. ........... | 123/568.14 |

FOREIGN PATENT DOCUMENTS

DE 195 27 218 6/1996
EP 1 026 384 8/2000

* cited by examiner

*Primary Examiner*—Willis R. Wolfe, Jr.
*Assistant Examiner*—Johnny H. Hoang
(74) *Attorney, Agent, or Firm*—Nixon & Vanderhye PC

(57) ABSTRACT

A fuel injection controller performs minute injection amount learning for learning an injection characteristic of an injector related to a minute amount injection such as a pilot injection by performing n-times of injections of fuel amounts obtained by equally dividing a fuel injection amount required during idle rotation speed control. The controller performs relative injection amount learning for learning a variation in the injection characteristics among cylinders based on a correlation between output torque of an engine and the injection amount when the injections of the equally-divided fuel amounts are not performed. Learning areas of the minute amount injection learning and the relative injection amount learning are defined by the injection amount and fuel pressure such that the learning areas do not interfere with each other.

14 Claims, 10 Drawing Sheets

FIG. 13

| | | #1 | #2 | #3 | #4 | AVERAGE |
|---|---|---|---|---|---|---|
| I | Qc | | | 10 | | — |
| II | Qa | 9 | 8 | 10 | 9 | 9 |
| III | QR#i (Qc−Qa) | 1 | 2 | 0 | 1 | 1 |
| IV | ΔQlrn#i | 0 | 1 | −1 | 0 | 0 |
| V | CORRECTED INJECTION AMOUNT (Qa+ΔQlrn#i) | 9 | 9 | 9 | 9 | 9 |
| VI | Δ | 1 | 1 | 1 | 1 | — |
| VII | ΔQlrn0#i (QR#i−Δ) | 0 | 1 | −1 | 0 | — |
| VIII | CORRECTED INJECTION AMOUNT (Qa+ΔQlrn#i+Δ) | 10 | 10 | 10 | 10 | 10 |

US 7,474,952 B2

FUEL INJECTION CONTROLLER

CROSS REFERENCE TO RELATED APPLICATION

This application is based on and incorporates herein by reference Japanese Patent Application No. 2006-156891 filed on Jun. 6, 2006.

BACKGROUND OF THE INVENTION

1. Field of the Invention

The present invention relates to a fuel injection controller having a function of learning an injection characteristic of an injector.

2. Description of Related Art

It is common knowledge to measure a deviation of an actual injection characteristic of an injector of a diesel engine from a standard characteristic and to store the deviation in a fuel injection controller before the injector is shipped, for example, as described in JP-A-2000-220508. Thus, even if the actual injection characteristic is deviated from the standard characteristic because of an individual difference at the shipping stage of the injector, fuel injection control can be performed to compensate the measured deviation. Taking into consideration the fact that the deviation of the injection characteristic changes with pressure of fuel (fuel pressure) supplied to the injector, JP-A-2000-220508 describes measuring deviations of the injection characteristic in multiple ranges divided according to the fuel pressure and storing the deviations.

The measurement of the injection characteristic before the shipping of the product is performed before the injector is mounted to an internal combustion engine. Therefore, there is a possibility that it is difficult for the fuel injection control based on the measured values to realize an expected injection characteristic of the injector during output control of the engine. In addition to the individual difference, an aging is also a factor of the deviation of the injection characteristic peculiar to the injector from the standard characteristic. This makes it more difficult to realize the expected injection characteristic of the injector through the fuel injection control based on the measured values during the output control of the engine.

JP-A-2003-254139 describes dividing a fuel amount, which is required by feedback control, into equal amounts and injecting the divided amounts of the fuel in multiple times during idle rotation speed control. Based on a difference between the actual fuel amount at this time and a standard fuel amount, an injection characteristic of an injector regarding a minute amount injection such as a pilot injection of a diesel engine is learned. Thus, the injection characteristic of the minute amount injection can be learned. The learning is performed during the idle rotation speed control. Therefore, aging of the injector can also be handled. However, JP-A-2003-254139 cannot learn the injection characteristic over a wide range of the injection amount, which can be injected during the fuel injection control.

SUMMARY OF THE INVENTION

It is an object of the present invention to provide a fuel injection controller capable of appropriately learning an injection characteristic of an injector over a wide range of an injection amount, which can be injected during fuel injection control.

According to an aspect of the present invention, a fuel injection controller includes a first learning device and a second learning device. The first learning device has a torque calculating device for calculating an instantaneous torque equivalent as a torque equivalent of an output shaft of an internal combustion engine per unit time by filtering a sensed value of rotation speed of the output shaft and an estimating device for estimating an injection characteristic of an injector of the engine based on the instantaneous torque equivalent. The second learning device has an injecting device for injecting equally-divided injection amounts of a required injection amount of fuel for performing feedback control of conforming the sensed value of the rotation speed of the output shaft to a target value and a learning device for learning the injection characteristic of the injector based on the fuel injection amount as of the feedback control. The first learning device learns the injection characteristic of the injector in an area where learning by the second learning device is not performed.

It is thought that the rotation speed reflects the instantaneous torque caused in the output shaft. Therefore, the instantaneous torque equivalent can be calculated based on the rotation speed. A characteristic variation (change in rotation behavior and the like) of each cylinder can be grasped by monitoring the instantaneous torque equivalent for each cylinder. Taking into consideration the fact that the instantaneous torque equivalent is correlated with the fuel injection amount, the injection characteristic can be learned. Therefore, the first learning device can learn the injection characteristic of the injector regarding the injection amount, which can generate the torque of the output shaft through a single fuel injection.

The second learning device can learn an injection characteristic of the injector regarding an injection amount of a minute amount injection that does not mainly generate the torque of the output shaft such as an injection performed before the main injection in a multistage injection. Since the first learning device learns the injection characteristic in the range, in which the learning by the second learning device is not performed, complication of the processing due to duplicated learning can be avoided. The learning of the minute amount injection, which notably influences exhaust characteristics, is performed by the dedicated second learning device. Thus, more suitable learning for maintaining good exhaust characteristics can be performed.

The filtering should be preferably performed at a single frequency set based on a combustion frequency of the engine. Thus, the filtering of the rotation speed is performed at the frequency based on the combustion frequency of the engine. Accordingly, the instantaneous torque equivalent can be calculated in accordance with the combustion frequency by extracting the combustion frequency component from the rotation speed. Thus, the instantaneous torque equivalent of each time can be calculated while completing the balance of the torque in each combustion cycle of each cylinder.

BRIEF DESCRIPTION OF THE DRAWINGS

Features and advantages of an embodiment will be appreciated, as well as methods of operation and the function of the related parts, from a learning of the following detailed description, the appended claims, and the drawings, all of which form a part of this application. In the drawings:

FIG. 13 is a diagram showing effects of correction of an injection characteristic using the offset according to the embodiment.

DETAILED DESCRIPTION OF EXAMPLE EMBODIMENT

Figure 1:
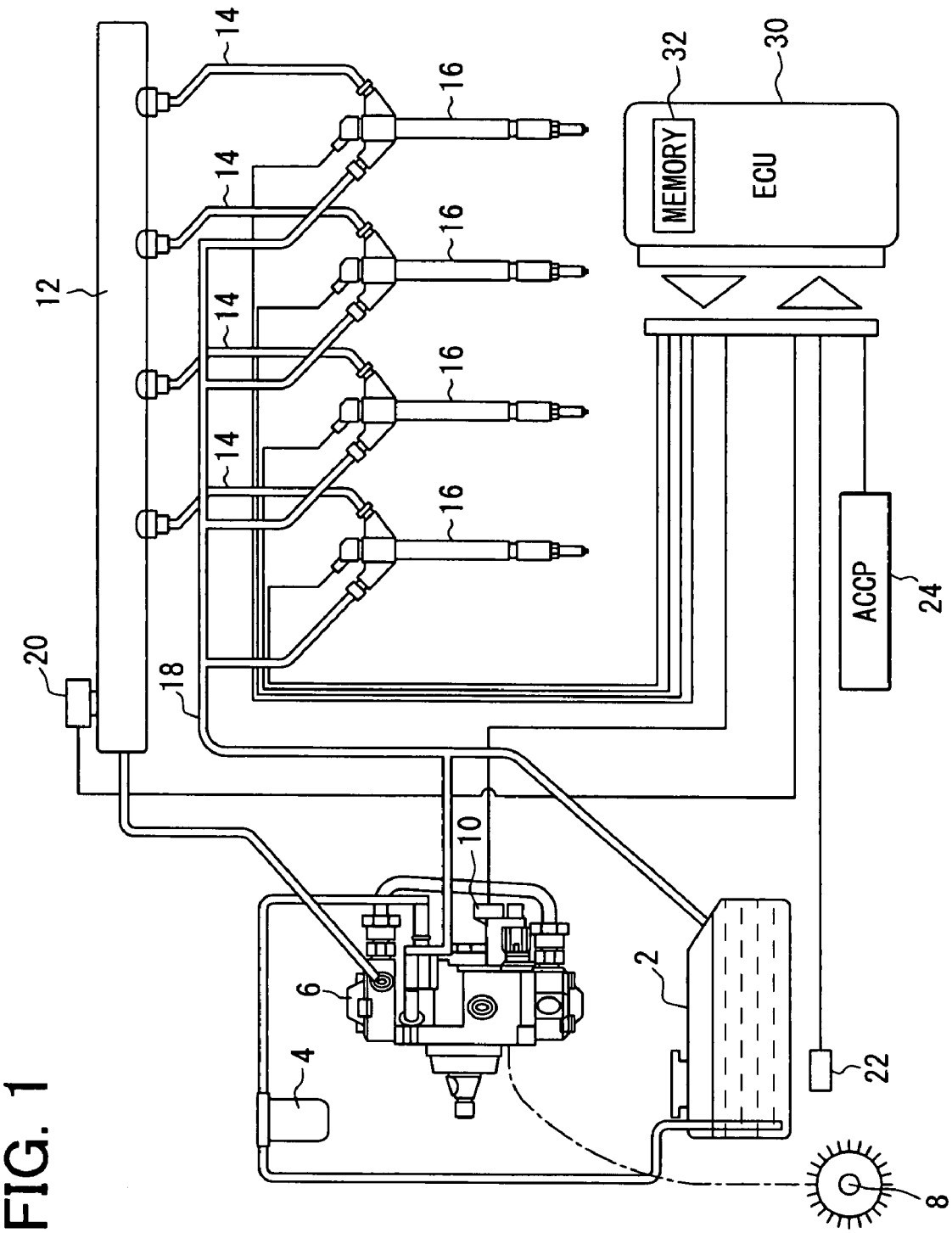
FIG. 1 is a schematic diagram showing an engine system structure according to an embodiment of the present invention.

Referring to FIG. 1, an engine system structure according to an embodiment of the present invention is illustrated. A fuel injection controller according to the present embodiment is applied to a fuel injection controller of a diesel engine. As shown in FIG. 1, fuel in a fuel tank 2 is suctioned by a fuel pump 6 through a fuel filter 4. The fuel pump 6 is a pump of an engine-driven type. The fuel pump 6 is applied with a motive force from a crankshaft 8 as an output shaft of the diesel engine. The fuel pump 6 is equipped with a suction metering valve 10. Through an operation of the suction metering valve 10, an amount of the fuel discharged to an outside is decided.

The fuel discharged from the fuel pump 6 is fed under pressure (pressure-fed) to a common rail 12. The common rail 12 accumulates the fuel pressure-fed from the fuel pump 6 at a high-pressure state and supplies the fuel to injectors 16 of respective cylinders (four cylinders are illustrated in FIG. 1) through high-pressure fuel passages 14. The injectors 16 are connected with the fuel tank 2 through a low-pressure fuel passage 18.

The engine system has various sensors for sensing operating states of the engine such as a fuel pressure sensor 20 for sensing fuel pressure in the common rail 12 and a crank angle sensor 22 for sensing a rotation angle of the crankshaft 8. The engine system has an accelerator sensor 24 for sensing an operation amount ACCP of an accelerator pedal operated according to acceleration requirement of a user.

An electronic control unit 30 (ECU) is structured mainly by a microcomputer. The ECU 30 has a constantly data holding memory 32 and the like. The constantly data holding memory 32 is a memory that maintains the memory of the data irrespective of a state of an ignition switch or a state of a main power source of the ECU 30. For example, the constantly data holding memory 32 is a nonvolatile memory such as EEPROM that maintains the stored data irrespective of existence or nonexistence of energization or a backup memory that constantly maintains an energized state.

The ECU 30 takes in the sensing results of the various sensors and controls an output of the engine based on the sensing results. The ECU 30 performs fuel injection control for operating the injectors 16 while controlling the fuel pressure in common rail 12 to desired fuel pressure in order to control the output of the engine. That is, the ECU 30 calculates a required injection amount based on the operation amount ACCP of the accelerator pedal sensed by the accelerator sensor 24 and rotation speed of the crankshaft 8 based on the sensing value of the crank angle sensor 22. Then, the ECU 30 divides the required injection amount into multiple injection amounts for a pilot injection, a main injection, an after injection and the like. The ECU 30 employs the injection amounts as command values of injection amounts (command injection amounts) of the injector 16. Then, the ECU 30 sets a command value of an injection period (command injection period) of the injector 16 based on the command injection amount and the sensed value of the fuel pressure sensor 20. Then, the ECU 30 opens the injector 16 according to the command injection period. Thus, the fuel injection of the required injection amount is performed.

The pilot injection injects a very minute amount of fuel to promote mixing of the fuel and air immediately before ignition. In addition, the pilot injection shortens a delay of the ignition timing after the main injection to inhibit generation of nitrogen oxides (NOx) and to reduce a combustion noise and vibration. The main injection injects the largest amount of the fuel in the multistage injection and contributes to generation of the output torque of the engine. The after injection causes reburning of particulate matters.

The actual injection characteristic of the injector 16 can deviate from the injection characteristic used as a standard in the fuel injection control. Desired fuel injection cannot be performed if the fuel injection control is performed on an assumption that each injectors 16 has the standard injection characteristic when the deviation occurs in the injection characteristic. In such a case, exhaust characteristic and the like can be deteriorated.

Figure 2:
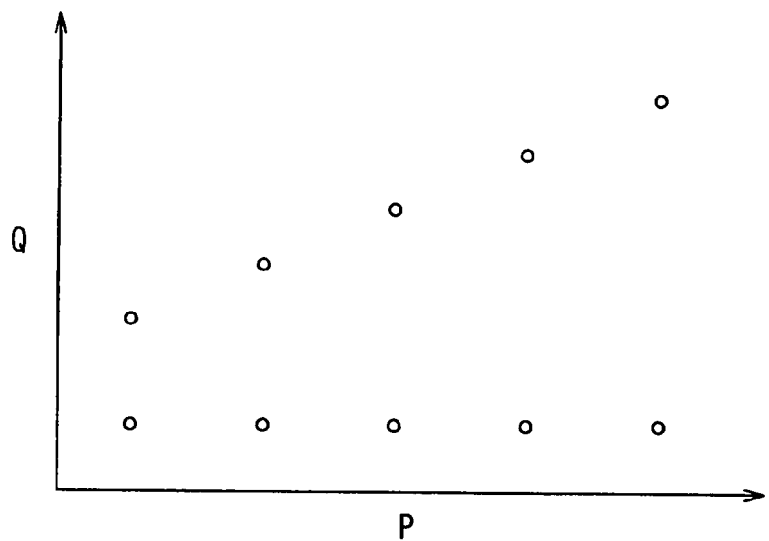
FIG. 2 is a diagram showing learning points of learning values coded in a QR Code according to the embodiment.
Figure 3:
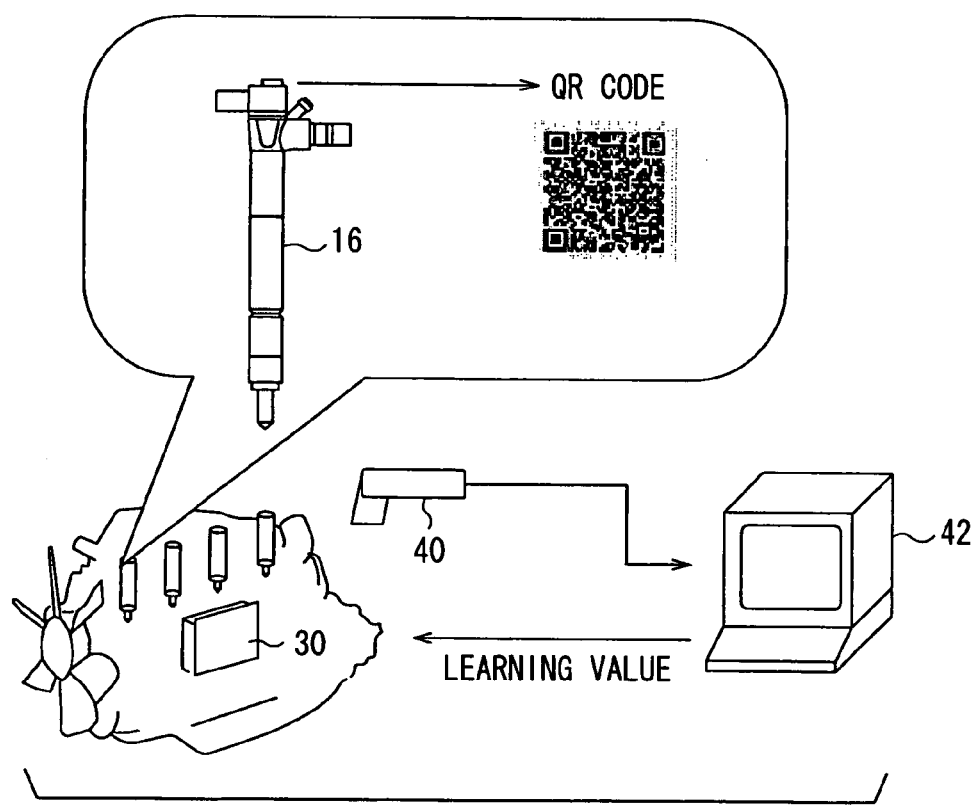
FIG. 3 is a schematic diagram showing a method of storing the learning values of the QR Code in an ECU according to the embodiment.

Therefore, in the present embodiment, the actual fuel injection amounts are measured beforehand at multiple measuring points illustrated by circles in FIG. 2 decided by the fuel pressure P and the injection amount Q before shipping of the injector 16 as a product. Based on the measurement, learning values for conforming the actual injection amounts to the injection amounts, which are decided by the standard injection characteristic, are calculated. The learning values are coded in a two-dimension code (QR Code) provided on the injector 16 as shown in FIG. 3. The QR Code is a two-dimension code having a general appearance shown in FIG. 3 and contains information along a lengthwise direction and a transverse direction. When the injector 16 is mounted to the engine, the learning values are read from the QR Code and are stored in the constantly data storing memory 32 in the ECU 30. That is, as shown in FIG. 3, the QR Code of the injector 16 is read with a QR Code scanner 40 and is once taken into a personal computer 42. The personal computer 42 converts the taken-in QR Code into data processable for the ECU 30 and outputs the data to the ECU 30. Thus, the ECU 30 can perform the fuel injection control while compensating for the variation in the injection characteristic resulting from the individual difference of the injector 16.

In the present embodiment, processing for learning the deviation of the injection characteristic of the injector 16 is performed during the fuel injection control after the injector 16 is mounted to the engine. In detail, processing (minute injection amount learning) for learning the injection characteristic related to the injection amount of the minute amount injection such as the pilot injection and processing (relative injection amount learning) for learning the characteristic variation in the injection characteristics among the cylinders regarding the injection amount other than the injection amount of the minute amount injection are performed.

Next, the minute injection amount learning and the relative injection amount learning will be explained.

<Minute Injection Amount Learning>

Figure 4:
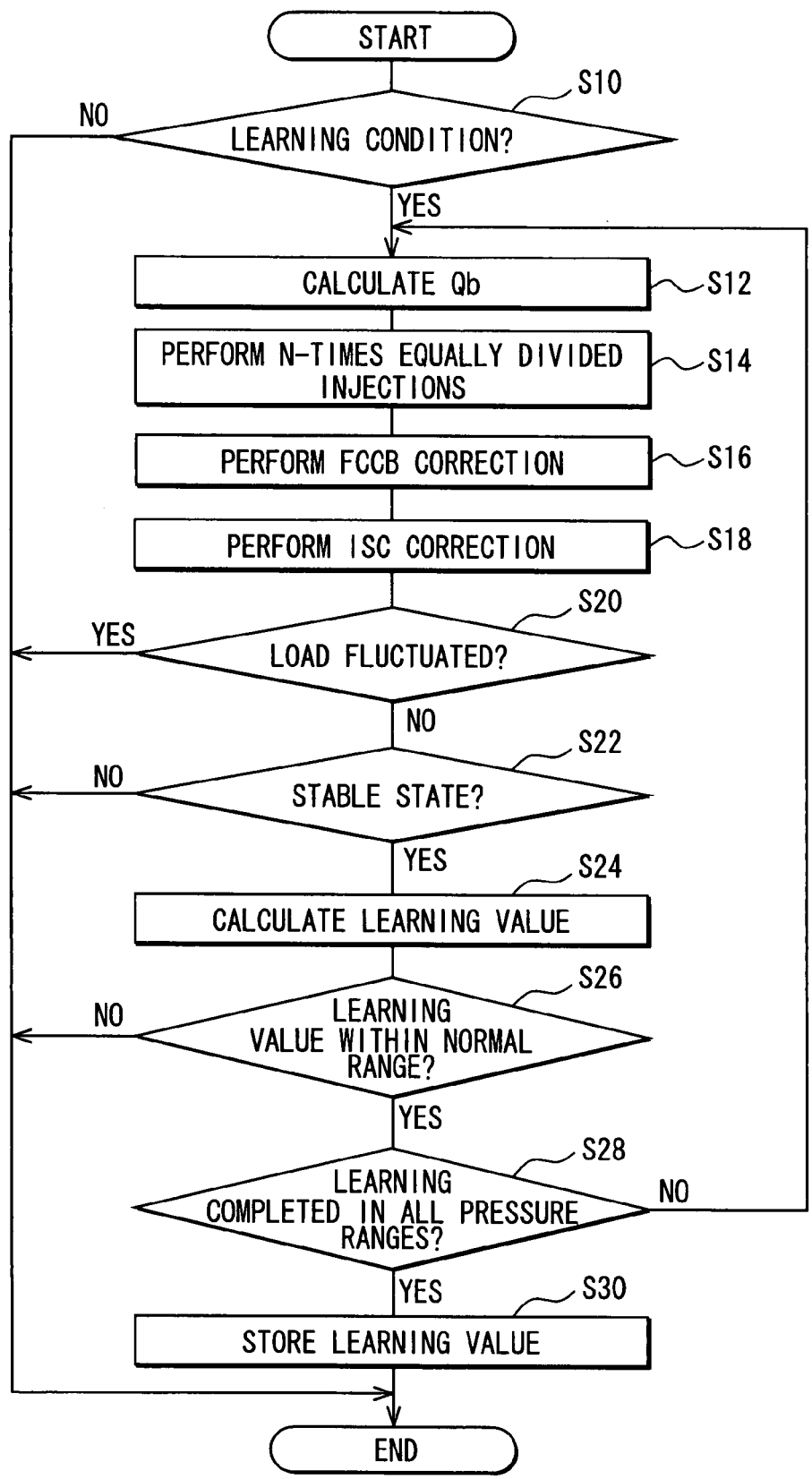
FIG. 4 is a flowchart showing processing steps of minute injection amount learning processing according to the embodiment.

FIG. 4 shows processing steps of the minute injection amount learning. The ECU 30 repeatedly performs the processing shown in FIG. 4 in a predetermined cycle. In a series of the processing, first, Step S10 determines whether a learning condition is established. The learning condition includes a condition that idle rotation speed control is performed and a condition that a fluctuation of a load applied to the crankshaft 8 is within an allowable range.

If Step S10 is YES, Step S12 calculates a basic injection amount Qb as an injection amount used as a standard required during control for conforming the actual rotation speed to target rotation speed. The standard injection amount is an injection amount decided by the standard characteristic of the injector 16 assumed in the fuel injection control. Following Step S14 performs the fuel injection n times by equally dividing the basic injection amount Qb (calculated at Step S12) into n pieces. Basically, a command injection amount is calculated by adding a previous learning value to 1/n of the basic injection amount Qb and the fuel injection of the thus-calculated command injection amount is performed n times. A command injection period decided by the injection amount may be corrected in accordance with an influence of an interval between the injections, for example. The correction may be performed with the method described in JP-A-2003-254139.

Step S16 performs correction (FCCB correction) of correcting the command injection amounts of the respective cylinders with FCCB correction values in order to compensate for the variation in the fluctuations of the rotation speed of the crankshaft 8 resulting from the combustion energies in the respective cylinders. In detail, each one of the injection amounts of n times is corrected with 1/n of the FCCB correction value (FCCB correction value/n). The detail of this processing may be performed with the method shown in JP-A-2003-254139.

Following Step S18 performs ISC correction of correcting the command injection amounts of all the cylinders with the same correction value (ISC correction value) to conform average rotation speed of the crankshaft 8 to target rotation speed. In detail, each one of the injection amounts of n times is corrected with 1/n of the ISC correction value (ISC correction value/n). The detail of this processing may be performed with the method described in JP-A-2003-254139.

Following Step S20 determines whether a situation that fluctuates the load applied to the crankshaft 8 has occurred after it is determined that the learning condition is established at Step S10. If Step S20 is NO, Step S22 determines whether the operating state of the engine is stable. For example, it is determined whether the change in the FCCB correction value or the ISC correction value is within a predetermined range.

If Step S22 is YES, Step S24 calculates the learning value at the present fuel pressure. The learning value is calculated by adding 1/n of the FCCB correction value and 1/n of the ISC correction value to the previous learning value. Following Step S26 determines whether a difference between the presently-calculated learning value and the previous learning value is within a predetermined range. If Step S26 is YES, it is determined that the presently-calculated learning value is normal and the process goes to Step S28. Step S28 changes the pressure supplied to the injector 16 and the processing of Step S12-Step S28 is performed. Thus, if the processing of Step S12-Step S28 is completed for all set pressure levels (i.e., if Step S28 determines that learning is completed in all pressure ranges), Step S30 writes the learning values newly learned this time into the constantly data holding memory 32.

When Step S10, S22 or S26 is NO or when Step S20 is YES, or when the processing at Step S30 is completed, this series of the processing is once ended.

<Relative Injection Amount Learning>

Figure 5A:
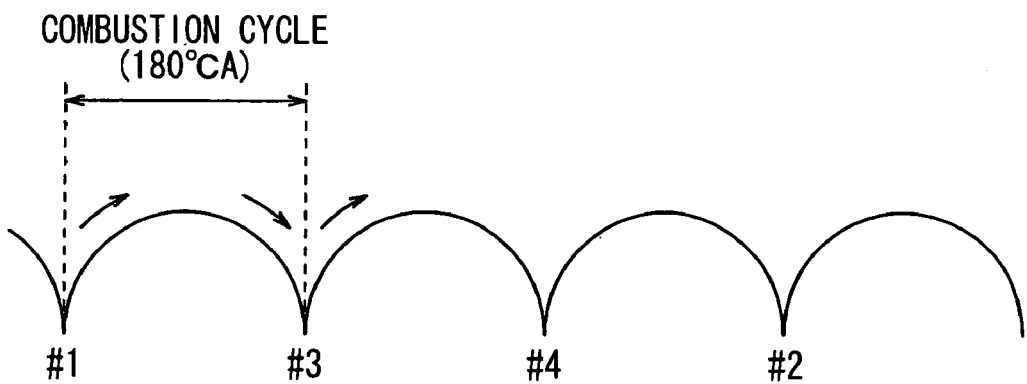
FIGS. 5A and 5B are time charts showing a transition of rotation speed corresponding to each cylinder according to the embodiment.

The rotation speed of the crankshaft 8 is controlled through the fuel injection control as desired not only during the idle rotation speed control but also during travel performed through accelerator operation by the user. By analyzing the rotation speed at minute time intervals, it is found that the rotation increase and the rotation decrease are repeated in synchronization with respective strokes in a combustion cycle. As shown in FIG. 5A, the combustion is performed in the order of the first cylinder #1, the third cylinder #3, the fourth cylinder #4, and the second cylinder #2. Notes #1, #2, #3 and #4 in FIG. 5A represent the combustion timings in the first to fourth cylinders #1-#4 respectively. The fuel is injected at an interval of 180° CA and is combusted. During the combustion cycle (180° CA cycle) of each cylinder, a rotating force is applied to the crankshaft 8 through the combustion such that the rotation speed increases, and then, the rotation speed decreases due to the load acting on the crankshaft 8 and the like. In this case, the work amount of each cylinder can be estimated in accordance with the behavior of the rotation speed.

Figure 5B:
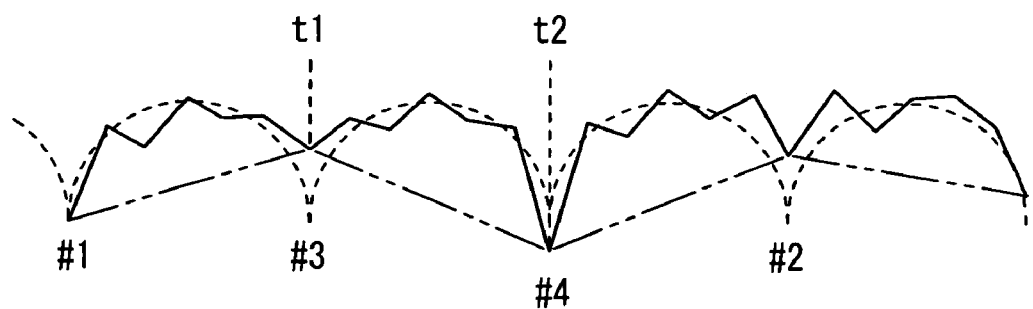

It is expected that the work amount of each cylinder can be calculated from the rotation speed at the end timing of the combustion cycle of the cylinder. For example, as shown in FIG. 5B, the work amount of the first cylinder #1 is calculated at timing t1 as the end timing of the combustion cycle of the first cylinder #1. The work amount of the following third cylinder #3 is calculated at timing t2 as the end timing of the combustion cycle of the third cylinder #3. However, in this case, the rotation speed calculated from the sensing signals (NE pulses) of the crank angle sensor 22 contains noises or components caused by a sensing error. As shown in FIG. 5B, the sensed value (solid line in FIG. 5B) of the rotation speed varies with respect to the actual rotation speed (broken line in FIG. 5B). Therefore, an exact work amount cannot be calculated at timings t1, t2 and the like. In FIG. 5B, a chain double-dashed line shows a transition of the calculated work amount of each cylinder.

Figure 6:
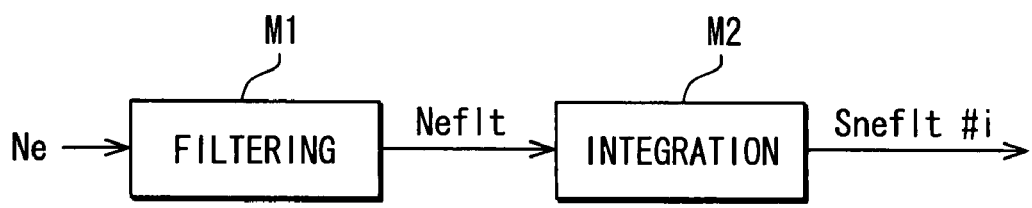
FIG. 6 is a block diagram showing control blocks for calculating an individual-cylinder work amount according to the embodiment.

Therefore, in the present embodiment, as shown in FIG. 6, the rotation speed Ne is inputted into a filtering section M1 as an input signal in a constant angular cycle. The filtering section M1 calculates an instantaneous torque equivalent Neflt by extracting only a rotation fluctuation component at each timing. The rotation speed Ne is sampled in an output cycle (30° CA, in the present embodiment) of the output pulse (NE pulse) of the crank angle sensor 22. For example, the filtering section M1 is provided by a BPF (band-pass filter). The BPF removes high-frequency components and low-frequency components contained in the rotation speed signal.

The instantaneous torque equivalent Neflt(i) as the output of the filtering section M1 is expressed by following Expression (1), for example.

$$Neflt(i) = k1 \times Ne(i) + k2 \times Ne(i-2) + k3 \times Neflt(i-1) + k4 \times Neflt(i-2) \quad \text{Expression (1)}$$

In Expression (1), Ne(i) represents the present sampling value of the rotation speed, Ne(i−2) is the second last sampling value of the rotation speed, Neflt(i−1) is the last value of the instantaneous torque equivalent, and Neflt(i−2) is the second last value of the instantaneous torque equivalent. k1-k4 are constants. The instantaneous torque equivalent Neflt(i) is calculated by Expression (1) each time the rotation speed signal is inputted into the filtering section M1.

Expression (1) is obtained by discretizing a transfer function G(s) shown by following Expression (2). In Expression (2), ζ represents a damping coefficient and ω is a response frequency.

$$G(s) = \frac{2\zeta \omega s}{s^2 + 2\zeta \omega s + \omega^2} \quad \text{Expression (2)}$$

Specifically, in the present embodiment, a combustion frequency of the engine is used as the response frequency ω and, in Expression (1), the constants k1-k4 are set based on the setting that the response frequency ω is the combustion frequency. The combustion frequency is an angular frequency representing the combustion frequency per unit angle. In the case of the four cylinders, the combustion cycle (combustion angular cycle) is 180° CA. The combustion frequency is decided by the inverse of the combustion cycle.

An integration section M2 shown in FIG. 6 takes in the instantaneous torque equivalent Neflt and carries out integration of the instantaneous torque equivalent Neflt over a constant interval for each combustion cycle of each cylinder. Thus, the integration section M2 calculates individual-cylinder work amounts Sneflt#1-Sneflt#4 as the torque integration values of the respective cylinders #1-#4. NE pulse numbers 0-23 are assigned to the NE pulses outputted in the cycle of 30° CA, respectively. The NE pulse numbers 0-5 are assigned to the combustion cycle of the first cylinder #1. The NE pulse numbers 6-11 are assigned to the combustion cycle of the third cylinder #3. The NE pulse numbers 12-17 are assigned to the combustion cycle of the fourth cylinder #4. The NE pulse numbers 18-23 are assigned to the combustion cycle of the second cylinder #2. The individual-cylinder work amounts Sneflt#1-Sneflt#4 are calculated by following Expression (3) for the first to fourth cylinders #1-#4 respectively.

$$Snelft\#1 = Nelft(0) + Nelft(1) + Nelft(2) + Nelft(3) + Nelft(4) + Nelft(5),$$

$$Snelft\#2 = Nelft(6) + Nelft(7) + Nelft(8) + Nelft(9) + Nelft(10) + Nelft(11),$$

$$Snelft\#3 = Nelft(12) + Nelft(13) + Nelft(14) + Nelft(15) + Nelft(16) + Nelft(17),$$

$$Snelft\#4 = Nelft(18) + Nelft(19) + Nelft(20) + Nelft(21) + Nelft(22) + Nelft(23) \quad \text{Expression (3)}$$

The cylinder number will be expressed as #i, and each of the individual-cylinder work amounts Sneflt#1-Sneflt#4 corresponding to the cylinder #i will be expressed as an individual-cylinder work amount Sneflt#i.

Figure 7:
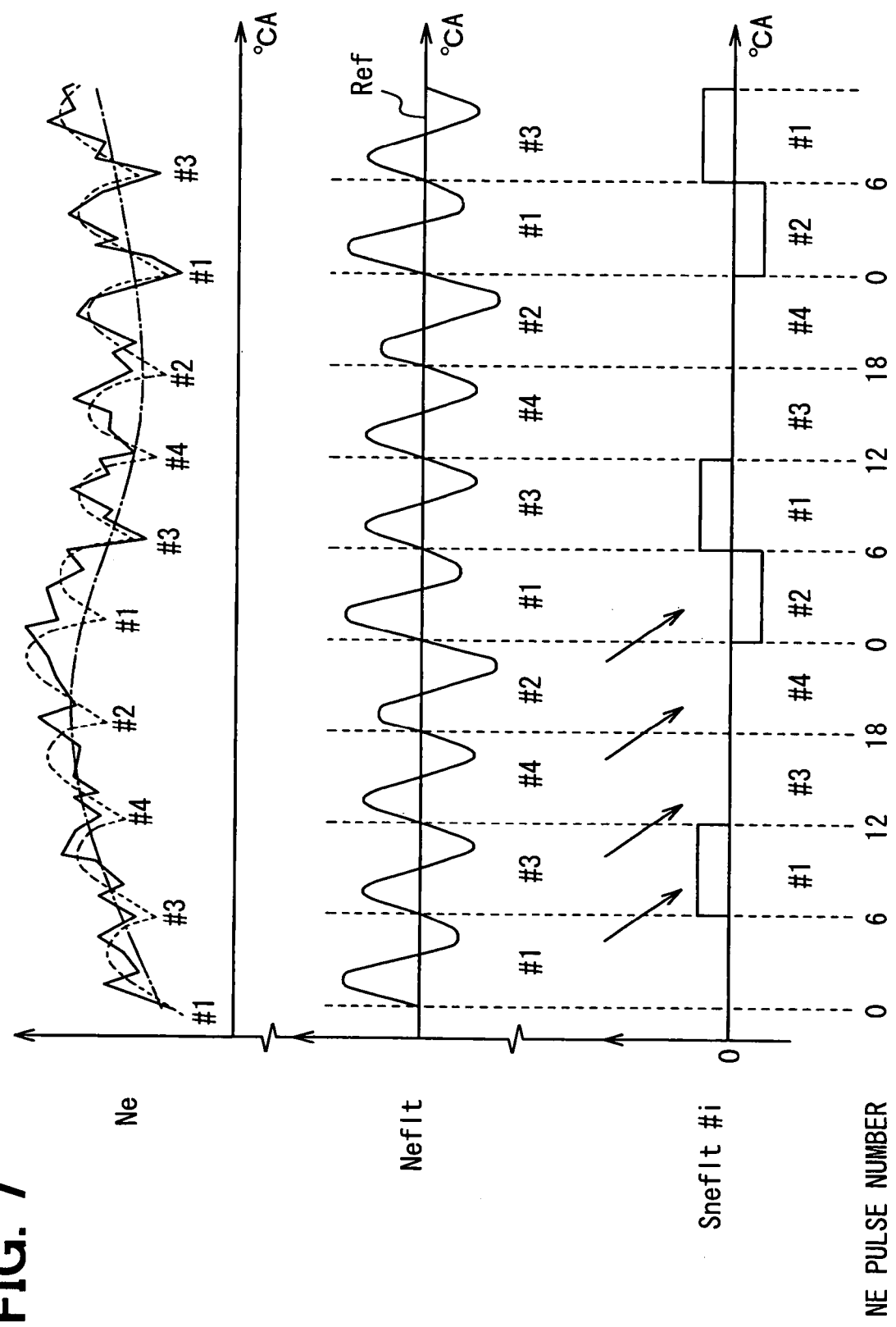
FIG. 7 is a time chart showing transitions of the rotation speed, an instantaneous torque equivalent, and the individual-cylinder work amount according to the embodiment.

FIG. 7 is a time chart showing transitions of the rotation speed Ne, the instantaneous torque equivalent Neflt, and the individual-cylinder work amount Sneflt#i. As shown in FIG. 7, the instantaneous torque equivalent Neflt oscillates with respect to a reference level Ref. The individual-cylinder work amount Sneflt#i is calculated by integrating the instantaneous torque equivalent Neflt over the combustion cycle of each cylinder #i. The integration value of the instantaneous torque equivalent Neflt on a positive side of the reference level Ref corresponds to combustion torque, and the integration value of the instantaneous torque equivalent Neflt on a negative side of the reference level Ref corresponds to load torque. The reference level Ref is decided in accordance with average rotation speed of the entire cylinders.

Essentially, the balance between the combustion torque and the load torque should be zero and the individual-cylinder work amount Sneflt#i should be zero (combustion torque−load torque=0) in the combustion cycle of each cylinder #i. However, the individual-cylinder work amount Sneflt#i will vary if injection characteristics, friction characteristics and the like of the injectors 16 differ among the cylinders because of individual differences among the cylinders, aging deterioration or the like. For example, as shown in FIG. 7, the variation can be caused such that the individual-cylinder work amount Sneflt#1 of the first cylinder #1 is greater than zero and the individual-cylinder work amount Sneflt#2 of the second cylinder #2 is less than zero.

Figure 8:
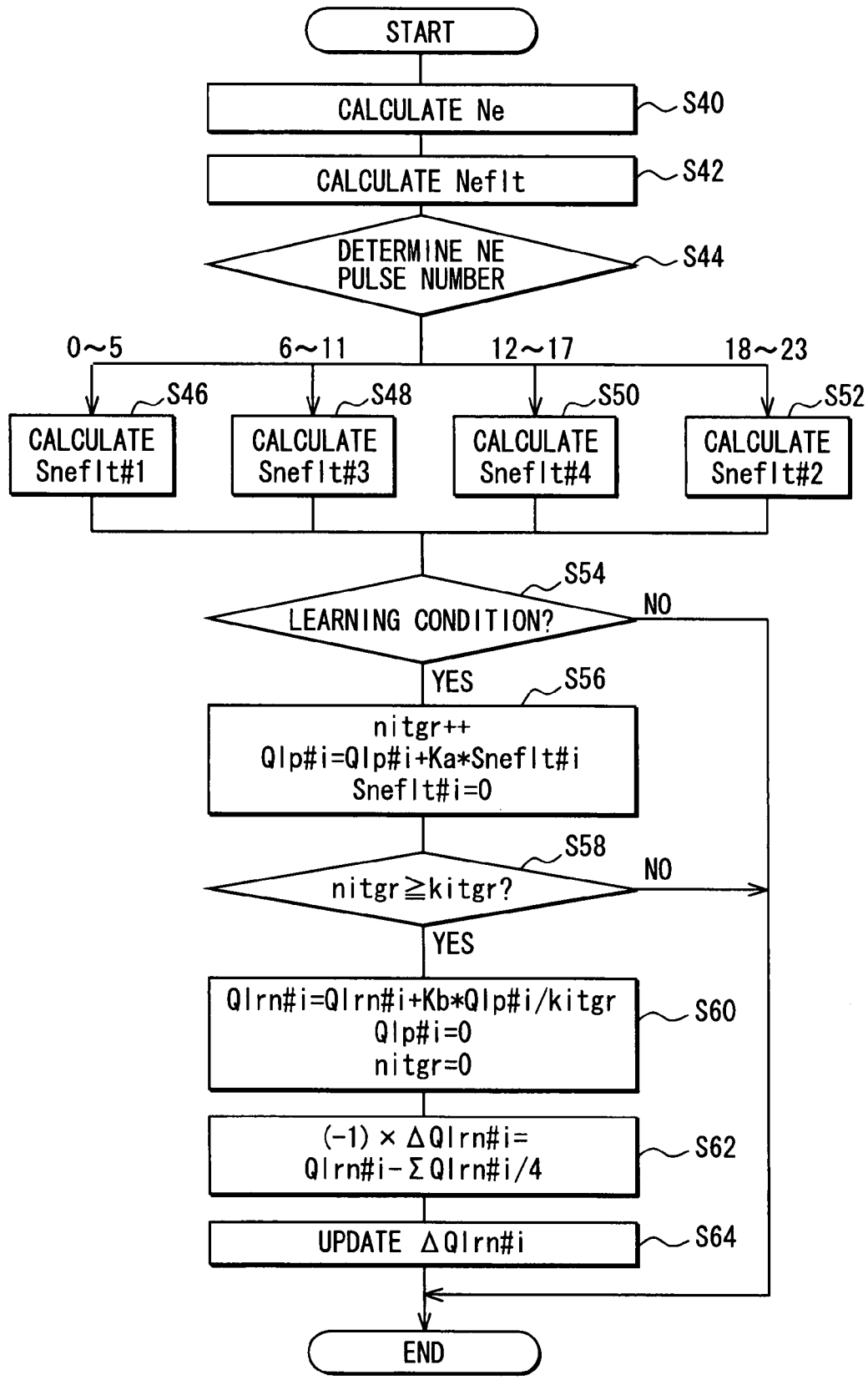
FIG. 8 is a flowchart showing processing steps of learning of the learning value according to the embodiment.

The difference between the injection characteristic of the injectors 16 or the like of each cylinder and a standard characteristic or a degree of the variation in the injection characteristics among the cylinders can be grasped by calculating the individual-cylinder work amounts Sneflt#i. Therefore, in the present embodiment, the deviation amounts of the injection characteristics of the injectors 16 among the cylinders are learned as the deviation amounts of the individual-cylinder work amounts Sneflt#i among the cylinders by using the individual-cylinder work amounts Sneflt#i. The processing steps of the calculation of the deviation amounts are shown in FIG. 8. The ECU 30 performs the processing shown in FIG. 8 when the NE pulse rises.

In the processing of FIG. 8, first, Step S40 calculates the time interval between the NE pulses based on present NE interruption timing and previous NE interruption timing. Step S40 calculates the present rotation speed Ne (instantaneous rotation speed) through inverse calculation of the time interval. Following Step S42 calculates the instantaneous torque equivalent Neflt(i) by using above-described Expression (1).

Following Step S44 determines the present NE pulse number. Steps S46-S52 calculate the individual-cylinder work amounts Sneflt#i for the first to fourth cylinders #1-#4. If the NE pulse number is in the range of "0-5", Step S46 calculates the individual-cylinder work amount Sneflt#1 of the first cylinder #1. If the NE pulse number is in the range of "6-11", Step S48 calculates the individual-cylinder work amount Sneflt#3 of the third cylinder #3. If the NE pulse number is in the range of "12-17", Step S50 calculates the individual-cylinder work amount Sneflt#4 of the fourth cylinder #4. If the NE pulse number is in the range of "18-23", Step S52 calculates the individual-cylinder work amount Sneflt#2 of the second cylinder #2.

Then, Step S54 determines whether a learning condition is established. The learning condition includes a condition that the calculation of the individual-cylinder work amounts Sneflt#i of the entire cylinders #i is completed, a condition that a power transmission device (drive train) of a vehicle is in a predetermined state, a condition that environmental conditions are in predetermined states, and the like. The learning condition is determined to be established when all of the subordinate conditions are satisfied. For example, a condition that a clutch device of a drive train system is not in a partial clutch engagement state may be used as the condition related to the drive train. A condition that engine coolant temperature is equal to or higher than predetermined warm-up completion temperature may be used as the environmental condition.

If the learning condition is not established, the processing is ended immediately. If the learning condition is established, the process goes to Step S56. Step S56 increments a counter nitgr by one and calculates integration values Qlp#i for the respective cylinders #1-#4 by using following Expression (4). The integration value Qlp#i is an integration value of the injection characteristic value calculated by multiplying the individual-cylinder work amount Sneflt#i by a conversion coefficient Ka. The integration value Qlp#i is for calculating the injection characteristic value by performing the averaging processing predetermined times when the counter nitgr reaches the predetermined times.

$$Qlp\#i = Qlp\#i + Ka \times Sneflt\#i \qquad \text{Expression (4)}$$

The individual-cylinder work amounts Sneflt#i are cleared to zero if the above-described processing is performed. Then, Step S58 determines whether the counter nitgr reaches predetermined times kitgr (nitgr≧kitgr). The predetermined times kitgr is set at a value capable of suppressing a calculation error due to a noise and the like during the calculation of the injection characteristic value, which is calculated by multiplying the individual-cylinder work amount Snefit#i by the conversion coefficient Ka. If nitgr≧kitgr, the process goes to Step S60. Step S60 calculates the injection characteristic value Qlrn#i of each cylinder by following Expression (5). The integration value Qlp#i is cleared to zero and the counter nitgr is also cleared to zero.

$$Qlrn\#i = Qlrn\#i + Kb \times Qlp\#i / kitgr \qquad \text{Expression (5)}$$

In Expression (5), the integration value Qlp#i integrated the predetermined times kitgr is averaged, and the injection characteristic value Qlrn#i is updated with the averaged learning value. At this time, an error in the individual-cylinder work amount Sneflt#i at each time is absorbed by averaging the integration value Qlp#i. In Expression (5), the coefficient Kb may be set in a range greater than zero and not greater than one (0<Kb≦1), for example.

Then, Step S62 calculates the learning value ΔQlrn#i by following Expression (6).

$$(-1) \times \Delta Qlrn\#i = Qlrn\#i - \frac{1}{4}\Sigma Qlrn\#i \qquad \text{Expression (6)}$$

The deviation amount of the injection characteristic value Qlrn#i of each cylinder from the average value (ΣQlrn#i/4) of the injection characteristic values Qlrn#i of all the cylinders can be calculated by Expression (6). The learning value ΔQlrn#i is provided by inverting the sign of the right-hand side of Expression (6) in order to obtain the learning value ΔQlrn#i as a value for compensating the deviation among the cylinders. The processing of Step S62 has not only the function of calculating the deviation amounts among the cylinders but also a function of preventing the injection characteristic of the injector 16 provided by compensation with the learning value from deviating largely from the standard characteristic. That is, since the value below LSB as the minimum computing unit is rounded in the computing process of Step S60, there is a possibility that the injection characteristics of the injectors 16 of all the cylinders deviate from the standard characteristic as a whole. Therefore, the processing of Step S62 removes such the possibility by carrying out the processing that uses the average value of all the cylinders as the standard.

Following Step S64 writes the learning value ΔQlrn#i in a predetermined area of the constantly data holding memory 32. In detail, the learning value ΔQLrn#i is calculated for each one of multiple areas divided in accordance with the parameters of the fuel injection amount and the fuel pressure in the common rail 12 and stored as the learning value peculiar to the area.

<Learning Areas of Minute Injection Amount Learning and Relative Injection Amount Learning>

Figure 9:
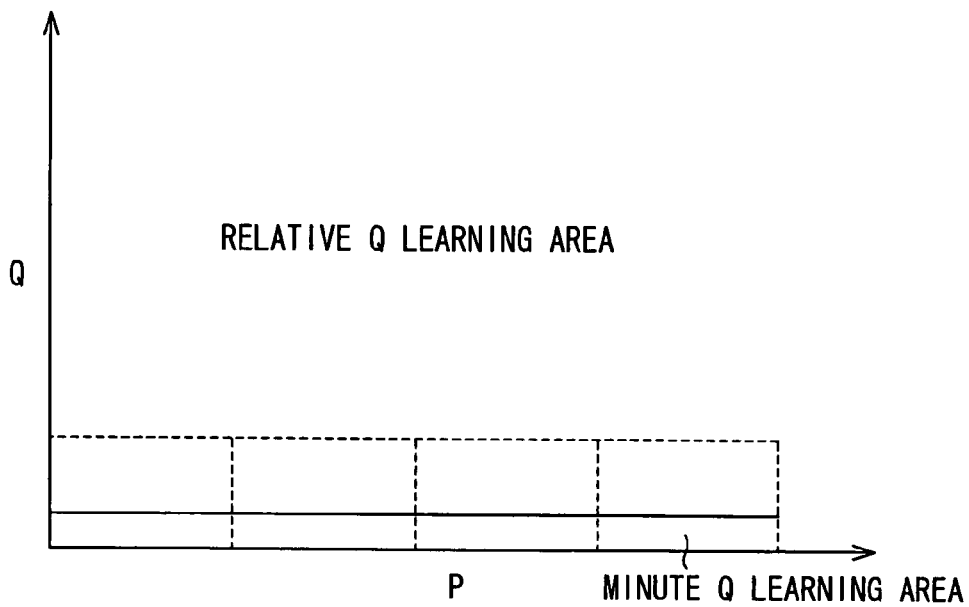
FIG. 9 is a diagram showing areas of relative injection amount learning and the minute injection amount learning according to the embodiment.
Figure 10:
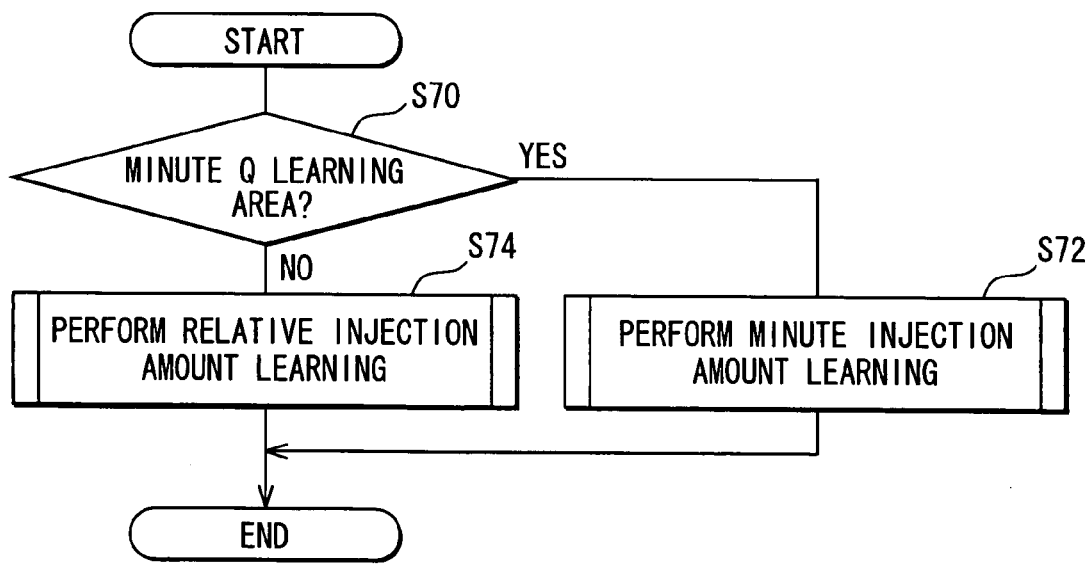
FIG. 10 is a flowchart showing processing steps for defining the area for performing the relative injection amount learning according to the embodiment.

In the present embodiment, the area for performing the minute injection amount learning and the area for performing the relative injection amount learning are partitioned by a solid line shown in FIG. 9 as an area of the injection amount Q less than a predetermined amount and an area of the injection amount Q greater than the predetermined amount. That is, the minute injection amount learning is performed in the area of the minute injection amount Q ("MINUTE Q LEARNING AREA" in FIG. 9), and the relative injection amount learning is performed in the area ("RELATIVE Q LEARNING AREA" in FIG. 9) of the injection amount Q greater than in the minute injection amount learning area. Therefore, the ECU 30 performs processing shown in FIG. 10. FIG. 10 shows the processing steps of the selection between the relative injection amount learning and the minute injection amount learning. The ECU 30 repeatedly performs this processing, for example, in a predetermined cycle.

In a series of the processing, Step S70 determines whether the present area is the minute injection amount learning area. This processing determines whether the affirmative determination is provided in the processing of Step S10 shown in FIG. 4. If Step S70 is YES, Step S72 performs the minute injection amount learning shown in FIG. 4. In detail, the processing of Step S72 corresponds to processing at Step S12 and following steps of FIG. 4. If Step S70 is NO, Step S74 performs the processing shown in FIG. 8.

Thus, in the present embodiment, complication of the learning processing due to duplicated learning can be avoided by performing the relative injection amount learning in the area where the minute injection amount learning is not performed. Moreover, this scheme is effective in maintaining the high accuracy of the learning in the case where the used injector 16 has the characteristic that the rate of the increase in the injection amount to the increase in the injection period largely changes in accordance with the injection period. That is, in the case where the injector 16 has such the characteristic, there is a possibility that the learning value, which is obtained through the relative injection amount learning by conforming the area of the injection amount corresponding to the basic injection amount at the idle rotation speed to the area of the injection amount corresponding to the minute amount injection as shown by a broken line in FIG. 9, largely differs from the learning value obtained through the minute injection amount learning. Therefore, if the learning is performed by using the areas shown by the broken line in FIG. 9, there is a possibility that the control accuracy of the minute amount injection is deteriorated.

<Correction of Relative Injection Amount Learning>

The learning value ΔQlrn#i obtained by the relative injection amount learning is a value for compensating for the variation in the injection characteristics among the cylinders. The learning value ΔQlrn#i does not compensate for the deviation between the actual injection characteristic of the injector 16 of each cylinder and the standard characteristic assumed in the fuel injection control. The various types of control in the ECU 30 are adjusted by assuming the standard characteristic. Therefore, if the learning value ΔQlrn#i calculated based on the relative injection amount learning is used, there is a concern that the maintenance of the various types of control at optimal states becomes difficult. For example, when the target value of the fuel pressure in the common rail 12 or the like is set based on the command injection amount to maintain good exhaust characteristics, the exhaust characteristics deteriorate because the actual injection amount deviates from the command injection amount.

Therefore, in the present embodiment, a correction value (offset Δ) uniform among all the cylinders for compensating for the difference between the injection characteristic realized by using the learning value provided by the relative injection amount learning and the standard injection characteristic is calculated based on the learning value as of the product shipping coded in the QR Code. In detail, in addition to the offset Δ, an initial value of the relative injection amount learning value is calculated based on the learning value coded in the QR Code.

Figure 11:
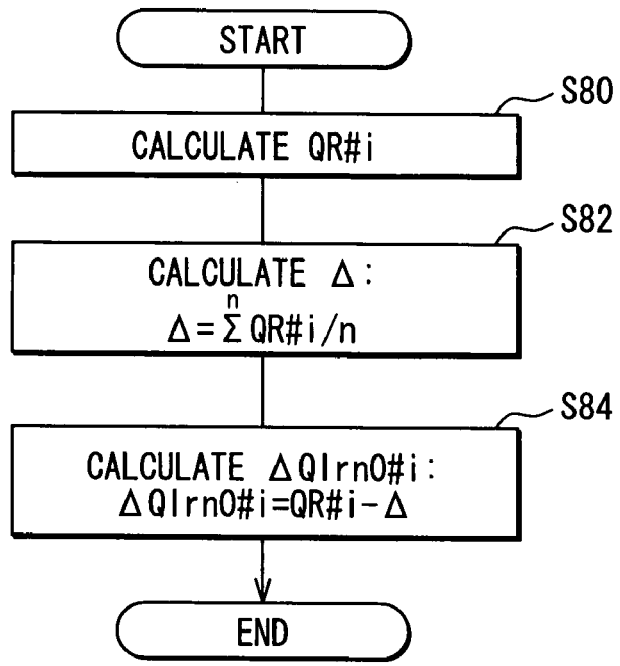
FIG. 11 is a flowchart showing processing steps for calculating an offset according to the embodiment.

FIG. 11 shows processing steps of calculation processing of the initial value of the relative injection amount learning value and the offset Δ. For example, the ECU 30 performs this processing immediately after the learning value coded in the QR Code is written in the ECU 30 as shown in FIG. 3.

Figure 12:
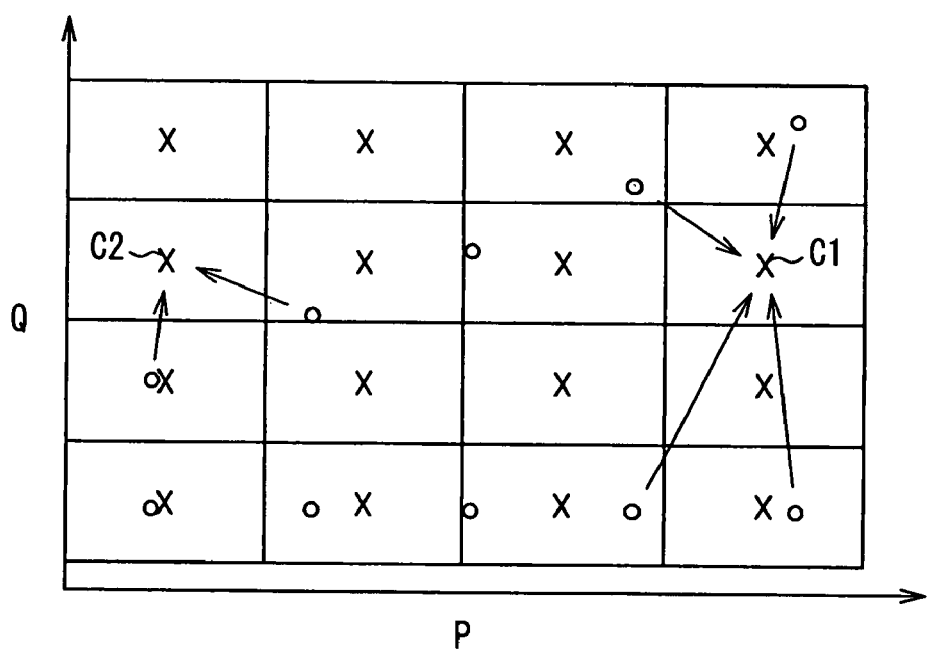
FIG. 12 is a diagram showing processing modes of the calculation processing according to the embodiment.

In a series of the processing, first, Step S80 calculates a learning value QR#i for each area of the relative injection amount learning based on the learning value coded in the QR Code. Each learning value ΔQlrn#i of the relative injection amount learning is stored for each one of areas divided in accordance with the fuel pressure P and the injection amount Q as shown in FIG. 12. In detail, the learning value ΔQlrn#i is stored as a learning value at a center point of each area as shown by x mark in FIG. 12. The center point is defined because the learning value ΔQlrn#i is calculated by interpolation computation if the command injection amount Q and the fuel pressure P are located at a point other than the center point when the learning value is used in the fuel injection control.

The learning values coded in the QR Code shown by the circle marks in FIG. 12 are converted into the values at the center points of the respective areas. Basically, as shown by a center point C1 in FIG. 12, the interpolation computation of the converted value at the center point is performed based on the learning values of the QR Code at the points surrounding the center point. In the case where the center point (for example, another center point C2 shown in FIG. 12) is not surrounded by the points at which the learning values of the QR Code are defined, an interpolation computation value using the learning values of the QR Code at the points corresponding to the fuel pressure values close to the fuel pressure value at the center point or the learning value of the QR Code is used as the converted value at the center point. The learning value corresponding to the fuel pressure close to the fuel pressure at the center point is used because an injection characteristic of the injector 16 greatly depends on the fuel pressure.

After the value QR#i of each area is thus calculated, Step S82 calculates the offset Δ as the average value of the values QR#i. The offset Δ is the value for compensating for the deviation between the average characteristic and the standard characteristic of the injector 16 of the engine.

Then, Step S84 calculates the initial value ΔQlrn0#i of the relative injection amount learning value in each area. The initial value ΔQlrn0#i is calculated by subtracting the offset Δ from each value QR#i. By using the thus-calculated offset Δ, the injection characteristic of the injector 16 can be conformed to the standard characteristic with high accuracy.

FIG. 13 shows an example of improvement of the fuel injection control accuracy achieved by using the offset Δ. In FIG. 13, the command injection amount Qc is "10", which is ten times as great as a unit amount. FIG. 13 shows an example in which the actual injection amounts Qa of the cylinders #1-#4 are "9", "8", "10", and "9" respectively. In this case, the learning values coded in the QR Code (QR learning values: QR#i=Qc−Qa) are "1", "2", "0", and "1" respectively. By using the QR learning values QR#i, the injection characteristic of the injector 16 can be conformed to the standard characteristic.

Since the relative injection amount learning values ΔQlrn#i are the values for compensating for the deviations from the average value of the injection amounts of all the cylinders, the relative injection amount learning values ΔQlrn#i are "0", "1", "−1", and "0" respectively. Though the variation in the injection amounts among the cylinders are compensated by using the relative injection amount learning values ΔQlrn#i, the injection amounts of the cylinders are brought to "9" uniformly. As a result, the injection amounts are deviated from the values based on the standard injection characteristic. It is because the average value of the injection amounts of all the cylinders is "9" and each relative injection amount learning value ΔQlrn#i is a value for conforming the injection amount of each cylinder to the average value "9." In contrast, in the present embodiment, the offset Δ is added to the relative injection amount learning value ΔQlrn#i to conform the injection amount after the correction (i.e., corrected injection amount) to the value based on the standard injection characteristic.

Figure 14:
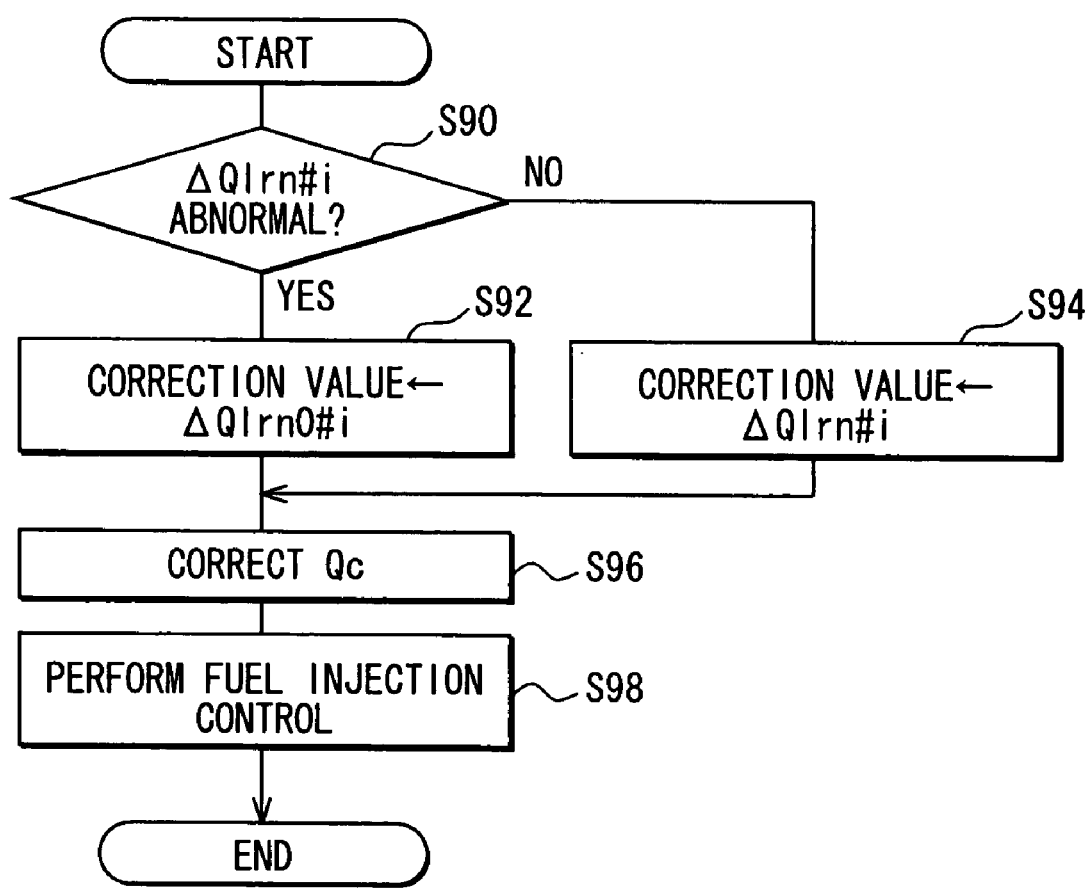
FIG. 14 is a flowchart showing processing at the time of an abnormality of the relative injection amount learning according to the embodiment.

The initial value ΔQlrn0#i of the relative injection amount learning value is used as a substitute for the relative injection amount learning value ΔQlrn#i in a period after the ECU 30 is shipped and before the relative injection amount learning is performed. Furthermore, in the present embodiment, the initial value ΔQlrn0#i is used as the substitute for the relative injection amount learning value ΔQlrn#i also when it is determined that there is an abnormality in the relative injection amount learning as shown in FIG. 14. FIG. 14 shows processing steps related to the time when there is an abnormality in the relative injection amount learning. The ECU 30 repeatedly performs this processing, for example, in a predetermined cycle.

In a series of the processing, first, Step S90 determines whether there is an abnormality in the relative injection amount learning. For example, it may be determined that there is an abnormality in the relative injection amount learning if a period, in which the relative injection amount learning value ΔQlrn#i largely changes, is longer than a predetermined period or if an absolute value of the relative injection amount learning value ΔQlrn#i is equal to or greater than a predetermined threshold value.

If Step S90 determines that there is an abnormality in the relative injection amount learning, Step S92 sets the correction value for correcting the command injection amount other than that of the minute amount injection (e.g., pilot injection) at the initial value ΔQlrn0#i of the relative injection amount learning calculated by the processing of FIG. 11. If Step S90 determines that there is no abnormality in the relative injection amount learning, Step S94 sets the correction value at the relative injection amount learning value ΔQlrn#i. If the processing of Step S92 or S94 is completed, Step S96 corrects the command injection amount Qc with the sum of the correction value and the offset Δ. Step S98 performs the fuel injection control for operating the injector 16 by using the corrected command injection amount. If the processing of Step S98 is completed, this series of the processing is ended once.

Thus, the correction of the command injection amount with the unsuitable value can be avoided even when the relative injection amount learning cannot be performed appropriately, for example, when the crank angle sensor 22 is abnormal. Furthermore, in the case of a temporary abnormality in the relative injection amount learning, the correction of the command injection amount using the relative injection amount learning value $\Delta Qlrn\#i$ can be performed promptly when the relative injection amount learning recovers from the abnormality.

The present embodiment exerts following effects, for example.

(1) The function of performing the relative injection amount learning and the minute injection amount learning is provided and the relative injection amount learning is performed in the area where the minute injection amount learning is not performed. Thus, the complication due to the duplication of the learning can be avoided. Furthermore, as for the minute amount injection, which significantly effects the exhaust characteristics, the minute injection amount learning dedicated to the learning of the minute amount injection is performed. Thus, more suitable learning can be performed to maintain the preferable exhaust characteristics.

(2) The learning value of the relative injection amount learning and the learning value of the minute injection amount learning are learned for each one of the multiple areas divided in accordance with the pressure (fuel pressure) of the fuel supplied to the injector 16. Thus, the learning corresponding to the fuel pressure can be performed. Accordingly, the fuel pressure dependence of the injection characteristic of the injector 16 can be suitably handled.

(3) After the integration value of the instantaneous torque equivalent over a fixed interval for each cylinder is calculated, the average value of the integration values of all the cylinders is calculated. Then, the relative injection amount learning values $\Delta Qlrn\#i$ are calculated as the learning values of the injection characteristics based on the differences between integration values of the respective cylinders and the average value. Thus, the fuel injection control for smoothing the variation in the injection amounts among the cylinders can be performed.

(4) The initial value $\Delta Qlrn0\#i$ of the relative injection amount learning value is set by using the learning value coded in the QR Code. Thus, the correction of the operation of the injector 16 based on the relative injection amount learning can be performed immediately after the shipping of the ECU 30.

(5) The offset $\Delta$ as the correction value uniform among the cylinders is calculated by using the learning values coded in the QR Code. Thus, not only the injection amounts are equalized among the cylinders by using the relative injection amount learning values $\Delta Qlrn\#i$ but also the absolute value of the injection amount of each cylinder can be corrected into the value according to the standard injection characteristic.

(6) The fuel injection control is performed by using the initial value $\Delta Qlrn0\#i$ when the relative injection amount learning is abnormal. Thus, even when the relative injection amount learning is abnormal, the deviation of the injection characteristic of the injector 16 can be suppressed.

The above-described embodiment may be modified and implemented as follows, for example.

In the above-described embodiment, the value for compensating the deviation of the injection characteristic is learned as the learning value of the injection characteristic. Alternatively, for example, the actual injection amount may be learned as the learning value coded in the QR Code or the minute injection amount learning value. The learning value related to the relative injection amount learning may be learned as $\Delta Qlrn\#i \times (-1)$.

The method of the relative injection amount learning is not limited to the method illustrated in FIG. 8. For example, the frequency for performing the filtering may not be the single frequency. Other methods can be used as long as the methods perform the learning of the injection characteristic by using the correlation between the output torque of the engine, which is grasped from the rotation fluctuation of the crankshaft 8 accompanying the fuel injections in the respective cylinders, and the actual injection amount.

The method is not limited to the method that learns the learning value of the relative injection amount learning for each one of areas divided by the injection amount and the fuel pressure. For example, the areas divided by only the fuel pressure may be used. Also in this case, when the learning values coded in the QR Code are converted into the value at the center point of each of the areas used for the relative injection amount learning, the method of the interpolation computation using the learning values near the center point may be used as in the above-described embodiment.

The method of storing the learning values learned before the shipping is not limited to the method using the QR Code. Alternatively, for example, a method of using a one-dimensional code may be used. The timing for learning the learning value for compensating the deviation amount from the standard characteristic assumed in the fuel injection control may be timing of maintenance such as replacement of the injector 16 and the like in addition to the timing before the shipping of the ECU 30 as a product.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel injection controller comprising:
a first learning device that has a torque calculating device for calculating an instantaneous torque equivalent as a torque equivalent of an output shaft of an internal combustion engine per unit time by filtering a sensed value of rotation speed of the output shaft and an estimating device for estimating an injection characteristic of an injector of the engine based on the instantaneous torque equivalent; and
a second learning device that has an injecting device for injecting equally-divided injection amounts of a required injection amount of fuel for performing feedback control of conforming the sensed value of the rotation speed of the output shaft to a target value and a learning device for learning the injection characteristic of the injector based on the fuel injection amount as of the feedback control, wherein
the first learning device learns the injection characteristic of the injector in an operation area of the engine other than an operation area where the second learning device performs the learning.

2. The fuel injection controller as in claim 1, wherein
the first learning device learns the injection characteristic for each one of areas divided in accordance with pressure of the fuel supplied to the injector.

3. The fuel injection controller as in claim 1, wherein
the first learning device learns the injection characteristic for each one of areas divided in accordance with pressure of the fuel supplied to the injector and the fuel injection amount of the injector.

4. The fuel injection controller as in claim 1, wherein
the engine is a multi-cylinder internal combustion engine having a plurality of cylinders, and
the first learning device has an integration value calculating device for calculating an integration value of the instantaneous torque equivalent over a fixed interval for each cylinder, an integration value average value calculating device for calculating an average value of the integration values of all the cylinders and a deviation learning device for learning deviations in the injection characteristics among the cylinders based on differences between the integration values of the respective cylinders and the average value as the learning of the injection characteristics.

5. The fuel injection controller as in claim 4, further comprising:
a storing device that beforehand stores a plurality of correction values for conforming the injection characteristic of the injector to a standard injection characteristic assumed in fuel injection control performed by the fuel injection controller, the correction values being set in accordance with the pressure of the fuel supplied to the injector, wherein
the first learning device sets an initial value of the learning by using the correction values.

6. The fuel injection controller as in claim 5, wherein
the correction values are set further in accordance with the fuel injection amount of the injector.

7. The fuel injection controller as in claim 5, further comprising:
a determining device that determines existence or nonexistence of an abnormality in the first learning device, wherein
the fuel injection controller performs the fuel injection control by using the initial value instead of the deviation learned by the first learning device if it is determined that the abnormality exists in the first learning device.

8. The fuel injection controller as in claim 5, further comprising:
a converting device that converts at least one of the correction values into the learning value of each one of the areas for each cylinder;
a learning value average value calculating device that calculates an average value of the converted values of all the cylinders as a correction value that is uniform among all the cylinders and that is used when the injector is operated based on the deviation learned by the first learning device; and
a setting device that sets a difference between the converted value and the average value of the converted values as the initial value.

9. The fuel injection controller as in claim 8, wherein
the converting device uses one of the correction values as the learning value.

10. The fuel injection controller as in claim 9, wherein
the converting device selects one out of the correction values as the learning value based on the fuel supply pressure corresponding to the selected one of the correction values.

11. The fuel injection controller as in claim 8, wherein
the converting device calculates the learning value by performing interpolation of the correction values.

12. The fuel injection controller as in claim 11, wherein
the converting device selects the correction values to be used in the interpolation based on the fuel supply pressures corresponding to the selected correction values.

13. The fuel injection controller as in claim 8, further comprising:
a determining device that determines existence or nonexistence of an abnormality in the first learning device, wherein
the fuel injection controller performs the fuel injection control by using the initial value instead of the deviation learned by the first learning device if it is determined that the abnormality exists in the first learning device.

14. A fuel injection control method comprising:
a first learning step of calculating an instantaneous torque equivalent as a torque equivalent of an output shaft of an internal combustion engine per unit time by filtering a sensed value of rotation speed of the output shaft and of estimating an injection characteristic of an injector of the engine based on the instantaneous torque equivalent; and
a second learning step of injecting equally-divided injection amounts of a required injection amount of fuel for performing feedback control of conforming the sensed value of the rotation speed of the output shaft to a target value and of learning the injection characteristic of the injector based on the fuel injection amount as of the feedback control, wherein
the first learning step learns the injection characteristic of the injector in an operation area of the engine other than an operation area where the second learning step performs the learning.

* * * * *